March 22, 1949.   T. J. McLAUGHLIN   2,465,165
SIGNALING MEANS FOR TRAINING DEVICES
Filed May 18, 1944   5 Sheets-Sheet 1

THOMAS J. McLAUGHLIN
INVENTOR.

ATTORNEYS.

March 22, 1949.    T. J. McLAUGHLIN    2,465,165
SIGNALING MEANS FOR TRAINING DEVICES
Filed May 18, 1944    5 Sheets-Sheet 2
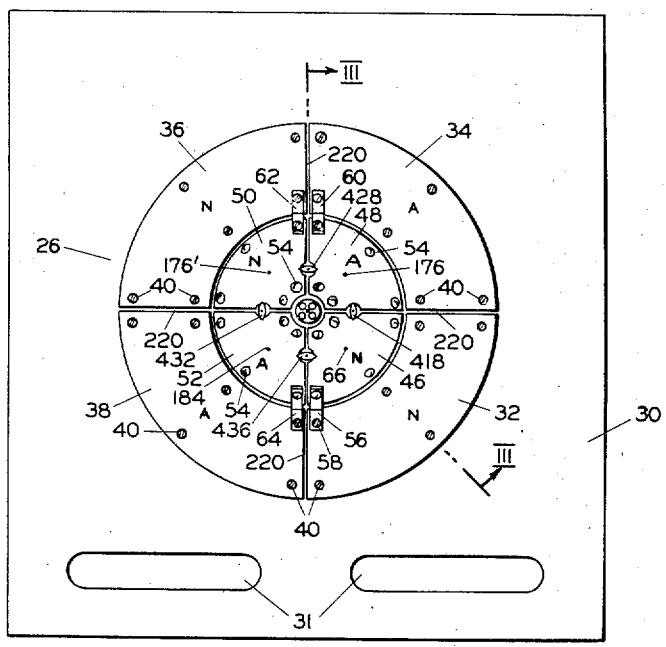
FIG. 2
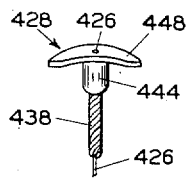
FIG. 9
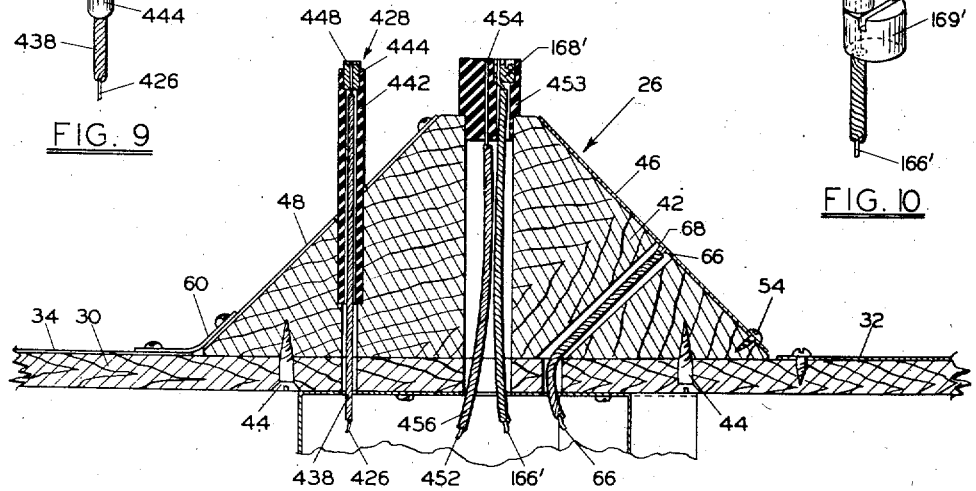
FIG. 3
FIG. 10
THOMAS J. McLAUGHLIN
INVENTOR.
BY
ATTORNEYS.

March 22, 1949.　　　　T. J. McLAUGHLIN　　　　2,465,165
SIGNALING MEANS FOR TRAINING DEVICES
Filed May 18, 1944　　　　　　　　　　　　　　5 Sheets-Sheet 4

THOMAS J. McLAUGHLIN
INVENTOR.

BY Donald T. Hillier
Philip S. Hopkins
ATTORNEYS.

March 22, 1949.　　　　T. J. McLAUGHLIN　　　　2,465,165
SIGNALING MEANS FOR TRAINING DEVICES Filed May 18, 1944　　　　　　　　　　　　　　5 Sheets-Sheet 5

THOMAS J. McLAUGHLIN
*INVENTOR.*

BY Donald T. Hellier
Philip S. Hopkins
ATTORNEYS.

Patented Mar. 22, 1949

2,465,165

UNITED STATES PATENT OFFICE 2,465,165

SIGNALING MEANS FOR TRAINING DEVICES

Thomas J. McLaughlin, Binghamton, N. Y., assignor to Link Aviation, Inc., a corporation of New York Application May 18, 1944, Serial No. 536,120

7 Claims. (Cl. 343—101)

1

My invention relates to an aviation trainer, and particularly to means for training pilots in the art of navigation by radio.

Radio aids have proved to be of great and increasing value to the navigator. Among the most important of these radio aids are the signals sent out by those stations commonly referred to as radio range stations. Each radio range station transmits a pattern marking four courses, normally 90° apart, although this spacing is often varied in order that one or more of the courses will coincide with an established airway. This system generally utilizes two pairs of transmitting towers which transmit interlocking Morse code signals. For instance, one pair of towers may be transmitting directionally the letter A (. —) while the other pair transmits the letter N (— .), the timing being synchronized so that at all times one pair of towers is transmitting a signal.

This arrangement produces the result that in any two diagonally opposite quadrants, as seen in Fig. 1, the A signal is heard clearly and the N signal is of a lesser intensity or is not heard at all, depending upon how far the plane is from an N quadrant. In the other pair of diagonally opposite quadrants, the relative intensities of the letters are reversed. Each quadrant slightly overlaps the neighboring ones and in the narrow wedge of about 3° that forms the center of the overlap, the A and N signals are heard with equal intensity so the dots and dashes of the two signals interlock to produce a continuous tone. This is the familiar "on-course" signal.

These A-N signals are interrupted about twice each minute for the transmission of two sets of station identifying signals. The first set of these identifying signals is always transmitted in the N quadrants by the N towers and the second set in the A quadrants by the A towers. If a pilot is near the bisector of an N quadrant, he will hear the N signal (— .) and the first station identification signal, but will not hear the A signal (. —), nor the second station identifying signal which is transmitted into the A quadrants.

If he is "on course," he will hear a dash about 25 seconds long, caused by the interlocking of the A and N signals, followed by the two sets of identifying signals, the first of which is transmitted by the N towers and the second by the A towers. If any departure from the course occurs, one interlocking signal and its corresponding station identifying signal becomes noticeably weaker. If the N signal and the first station identification signal is the weaker, the pilot knows that he is

2 in an A quadrant, while if the A signal and the second station identification signal is the weaker, he knows he is in an N quadrant. Different range stations transmit on different carrier frequencies, but these audible signals are always of the same frequency, namely, 1020 cycles per second.

The pilot, radio man or navigator of a plane, by intercepting the signals being transmitted by such a radio range station will therefore be able to tell whether the plane is in an A quadrant, an N quadrant or on one of the "on-course" beams. By maneuvering the plane and noticing the effects of the maneuvers upon the intercepted signals the pilot is able to locate the position of the plane in the radiated field pattern of the radio range station and, inasmuch as he has in the plane with him a map of the emanated field pattern of the station, he can ascertain the geographical position of the ship.

In the instruction of students to fly by means of the signals transmitted by these radio range stations it has been found particularly desirable to combine with a trainer of the type disclosed in U. S. Patents 1,825,462 and 2,099,857, means whereby simulated radio range signals may be transmitted to the student in the trainer who, by interpreting the simulated signals received, "navigates" the trainer in the same manner that he would actually navigate a real plane by means of actual radio range signals. Such means are disclosed in U. S. Patent 2,119,083.

It is common practice in the prior art to combine with such a trainer a recorder of the type disclosed in U. S. Patent 2,179,663, which recorder is placed upon a map of a real or imaginary radio range station signal field. This recorder travels at a rate proportional to the assumed ground speed of the trainer and responds directionally to the changes in the heading of the fuselage of the trainer so that the recorder travels at all times over the map in the same direction as the fuselage is assumed to be flying through the radio range signal field. The student in the trainer, by changing the heading of the fuselage in response to the simulated radio range signals received by him, controls the direction of the recorder's travel; and the recorder traces on the map the assumed track of the trainer through the assumed radio range signal field. The instructor in turn transmits signals to the student in the trainer in accordance with the observed position of the recorder upon the map, which position represents the assumed position of the trainer in an assumed radio range signal pattern.

Means under the manual control of the instructor whereby he can transmit A-N signals of varying relative intensities and of varying absolute intensities to the student in the trainer in accordance with the moving position of the recorder over the map are disclosed in United States Patent Number 2,119,083. However, such a system has several disadvantages. First, such a system requires the constant close attention of the instructor. Secondly, the instructor at all times must estimate the desired relative intensities of the A-N signals as well as the proper absolute volume to be given these signals, and then he must manually set the controls in the positions which he believes will give the estimated desired signal intensities. In order that the constant attention of an experienced instructor may be dispensed with, and in order to eliminate the inevitable errors of judgment upon the part of the instructor, it is highly desirable that there be automatic means for changing the relative as well as absolute intensities of these A-N signals as heard by the student in the trainer as the recorder changes its position upon the map. To meet this need devices known to the art as automatic radio ranges for grounded aviation trainers have been devised. These devices generally comprise means for establishing a quadrantal field of force keyed by A and N signals in simulation of the keying of the quadrants of a real radio range.

The keyed field of force is generally established below a smooth surface over which the recorder travels and an element responsive to the field of force is carried by the recorder and connected to suitable amplifying and receiving means which feed into the earphones of the student in the trainer. Therefore the signals received by the student depend upon the position of the recorder in the keyed field of force and he manipulates the trainer in response to the signals received to govern the direction of travel of the recorder just as he would control a plane in actual flight flying through a real radio range in response to the signals received.

It is a principal object of this invention to provide means whereby the miniature field of force which normally transmits A and N signals may be periodically interrupted and the fields of force properly keyed according to an assumed station identification signal in simulation of the corresponding practice outlined above employed in connection with real radio ranges.

As a plane in actual flight through a real radio range signal pattern approaches the station from a distance a gradual increase in the intensities of the intercepted signals occurs until the plane is a short distance from the transmitting towers. When this point is reached a sudden and greatly increased intensity of the intercepted signals occurs and immediately thereafter for a short distance in some real radio ranges no signal is intercepted. This area of no signal reception is commonly known as the cone of silence. However other radio ranges employ an auxiliary transmitter which transmits upwardly a steady note of 3000 cycles in a pattern to fill the otherwise present cone of silence. With this arrangement therefore the receiver in the plane instead of receiving no signal when in the cone of silence will receive the steady 3000 cycle note. This arrangement, known as a positive cone of silence, is employed in order that any possible fading of signals at a point other than above the cone of silence will not be mistaken by the pilot for the cone of silence.

As the plane continues over the cone of silence or positive cone of silence, as the case may be, the extremely high level signal is again encountered. Continued travel outward from the cone results in a rapid attenuation of signal level in a manner inverse to that experienced upon approaching the cone.

It is another principal object of this invention to provide separate elements properly keyed and fed with a high voltage to produce means for simulating the just described high level signals. These separate high voltage elements are preferably mounted as will be later disclosed so that they may be adjusted in accordance with the "on-course" signal areas of the automatic radio range.

Also in real radio ranges there is provided means whereby the station operator may if desired transmit oral intelligence at the same time that the towers are transmitting the A-N and station identification signals. This oral intelligence for example may be weather reports. At the same time radio receiving sets carried by planes in actual flight generally embody a three-position switch under the control of the operator of the receiving set. By selectively positioning the switch the receiver operator may cause filters in the receiving set to cut out the A-N signals allowing the oral signals to come through or he may cut out the oral signals allowing the A-N signals to come through. Further he may receive both types of signals.

Again, referring to real radio ranges for the purpose of comparison, upon the ground below, one or more of the on-course signal areas and located a few miles from the main transmitting towers an auxiliary transmitter known as a fan marker beacon may be placed. These beacons transmit upwardly a fan shaped signal pattern, the signal having a frequency of 3000 cycles per second and the signal is keyed in a pattern of 1, 2, 3 or 4 dash groups in order that the fan marker may be identified with a particular leg of the range station. Upon the hearing of this signal the pilot of a real plane knows that he is above one of the fan markers of the range station, and further, by noting the manner of keying of the signal he will be able to ascertain his exact location.

Another object of this invention is to provide cone shaped quadrantal plates for establishing the desired pattern of the automatic radio range, each of the cone shaped plates being connected by a conductor to an arcuate segment that is positioned at the base of each of the cone shaped segments. The cone shaped plates are mounted upon a cone shaped supporting block and the arcuate segments upon a flat member upon which the cone shaped block is placed. A suitable insulating block is placed at the apex of the cone shaped plates, this block holding the plurality elements which are fed by a higher potential than the cone shaped plates. This arrangement produces the desired changes in signal intensities as the recorder and pick-up antenna moves above the quadrant assembly.

In order that this invention may be more readily understood reference is made to the accompanying drawings which illustrate a preferred embodiment of the invention. In the figures, Fig. 1 is a general view of an aviation trainer of the type hereinbefore mentioned, the instructor's desk, the recorder mounted upon a chart of a real or assumed radio range and the general location of the quadrant plates of this invention relative to the chart and recorder.

Fig. 2 is a plan view of the quadrant assembly.

Fig. 3 is a cross sectional view of the quadrant assembly taken along the lines III—III of Fig. 2.

Fig. 9 is a detailed view of the fan marker simulating means.

Fig. 10 is a detailed view of a part of the quadrant assembly.

Figure 1:
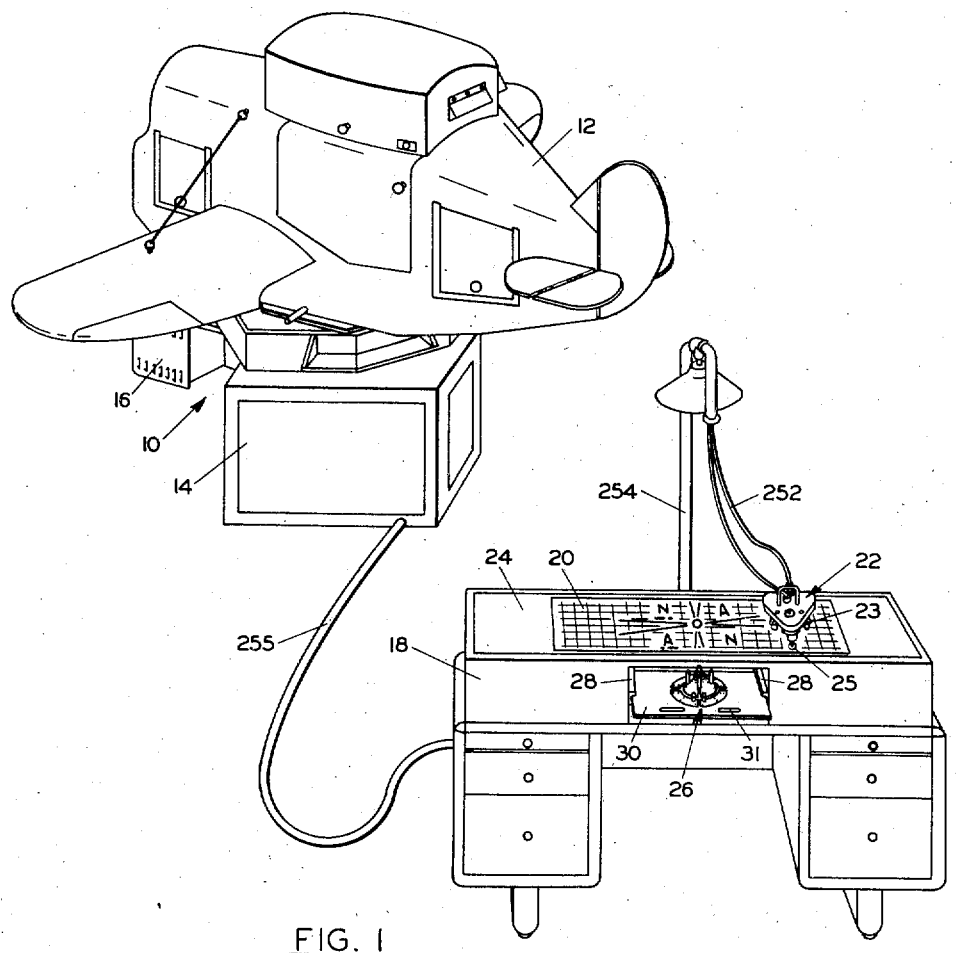

In Fig. 1 the numeral 10 designates generally a trainer of the type hereinbefore mentioned. This trainer comprises a fuselage 12 which is universally mounted upon a base 14 by means of an intermediate universal joint (not shown). By means of conventional airplane simulating controls the student in the trainer may cause the fuselage to bank to the left or right as well as to climb and dive, in simulation of the corresponding movements of a real plane in actual flight. A turning motor 16 is provided and by means of a pair of simulated rudder pedals within the fuselage 12 the student may cause the trainer to turn to the left or right about its vertical axis in simulation of the turning of a plane in actual flight.

The desk is numbered 18 and upon the top 24 of the desk is placed map 20 which shows the radiated field pattern of a real or assumed radio range station. Recorder 22 rests upon map 16. This recorder, as previously stated, travels over map 20 at a rate proportional to the assumed ground speed of the trainer and its direction of travel over the map is at all times in accordance with the assumed direction of travel of the trainer over the ground. This recorder comprises a pair of propelling wheels 23 (only one shown), and inasmuch as the recorder covers a considerable portion of map 20 the trainer is assumed to be located at the exact spot where the inking wheel 25 rests upon the map.

The top 24 of desk 18 is preferably made of an insulating material such as wood, Bakelite or glass. Beneath the top 24 of the desk is placed the quadrant assembly designated generally by 26, this quadrant assembly resting upon a wooden base 30 supported by guides 28.

Reference is now made to Figs. 2 and 3 which are views of the quadrant assembly and associated parts designated generally in Fig. 1 by 26. Referring to Fig. 2 the wooden base 30 is provided and four quarter circle arcuate plates 32, 34, 36 and 38 are attached to base 30 by means of screws 40. A pair of openings 31 are provided in base 30 for ease in removing the same from desk 18. Referring to Fig. 3 a cone shaped block 42 made of suitable insulating material such as wood is fixedly attached to base 30 by means of screws 44 and four quarter cone-shaped plates 46, 48, 50 and 52 are affixed to block 42 by means of screws 54. A jumper 56 connects arcuate plate 32 with its corresponding cone-shaped plate 46 by means of screws 58, the inner ends of which enter block 42. Similar jumpers 60, 62 and 64 connect the other three sets of arcuate plates with their corresponding quadrant cones in the same fashion. By virtue of this jumper arrangement it will be understood that any charge applied to one of the quarter cone-shaped plates will be applied at the same time to its corresponding arcuate plate. Consequently, for purposes of simplicity, hereinafter charging of the quarter cone shaped plates only is discussed, but it should be borne in mind that the arcuate plates are always charged simultaneously with their connected cone shaped plates.

Further, it should be noted that each of the arcuate shaped plates is separated from its adjoining arcuate plates by virtue of spaces 220, and the cone-shaped plates are similarly separated from one another so that they may be independently charged.

Quarter cone shaped plate 46 has connected thereto as seen in Fig. 3 a wire 66 covered by suitable insulating material 68. Each of the other three cone shaped sections has a similar arrangement as will be later shown.

Figure 4:
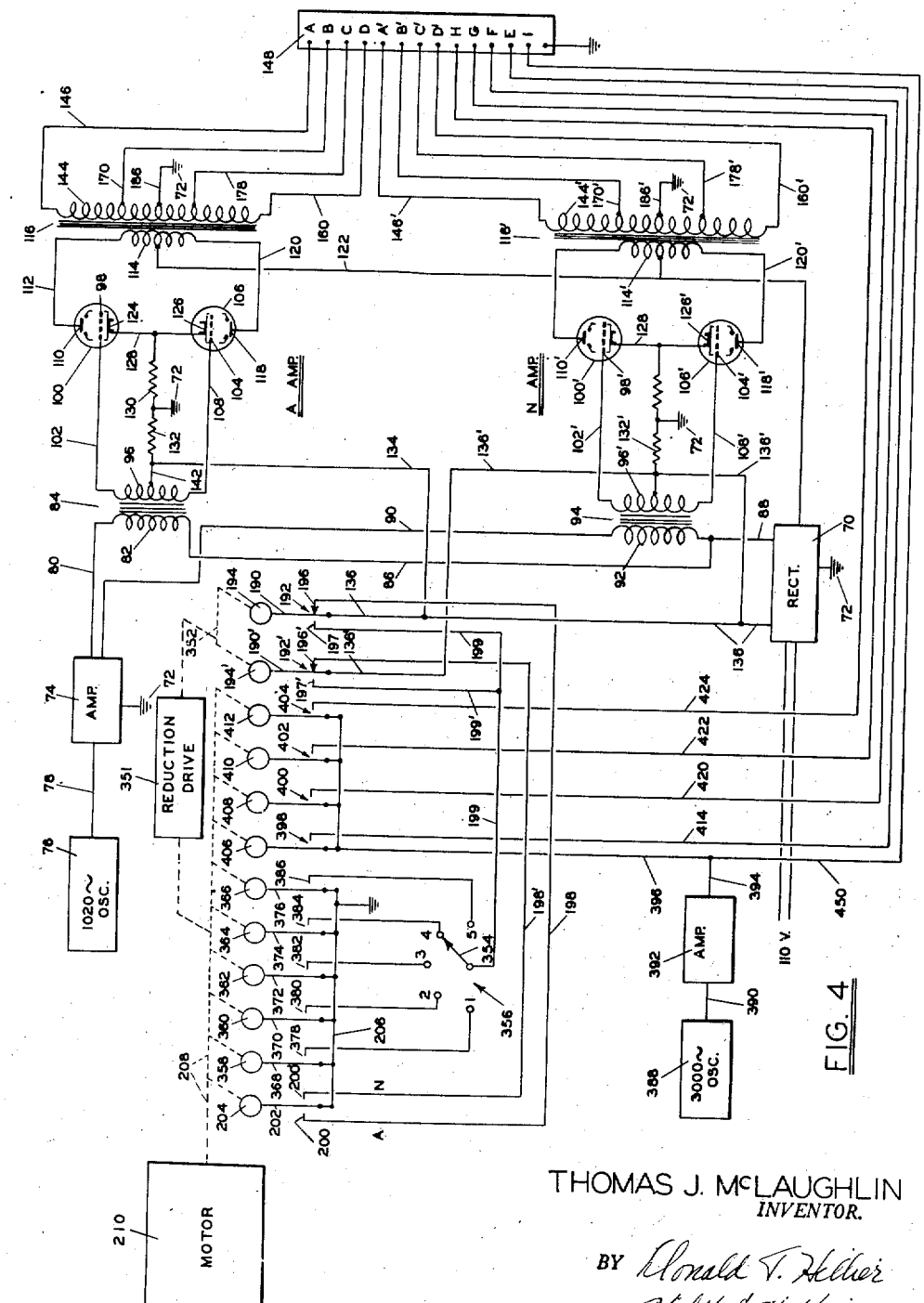
Fig. 4 is a diagrammatic wiring diagram of the signal generating means.

Reference is now made to Fig. 4 which shows schematically the means for generating the signals used in this invention. Seen in Fig. 4 is rectifier 70 connected to ground 72. Amplifier 74 is also connected to ground 72 and an oscillator 76 suitably supplied with power is provided, this oscillator generating a steady 1020 cycle signal. This signal is fed into amplifier 74 by means of conductor 78 and the direct current from rectifier 70 fed into amplifier 74 is modulated by the 1020 cycle voltage so that by means of conductor 80 a 1020 cycle alternating voltage is placed across the primary 82 of the transformer designated generally by 84. The other side of primary 82 is connected to rectifier 70 by means of conductors 86 and 88. Similarly by means of conductor 90 a 1020 cycle voltage is placed across the primary 92 of the transformer designated generally by 94, the other end of primary 92 also being connected to rectifier 70 by means of conductor 88. The secondary 96 of transformer 84 has one end connected to grid 98 of amplifier 100 by means of conductor 102 while the other side of secondary 96 is connected to the grid 104 of amplifier 106 by means of conductor 108. The plate 110 of amplifier 100 is connected by means of conductor 112 to one end of primary 114 of transformer designated generally by 116 while the plate 118 of amplifier 106 is connected by means of conductor 120 to the other side of the primary 114. The center tap of primary 114 is connected by means of conductor 122 to the rectifier 70. The cathode 124 of amplifier 100 is connected to the cathode 126 of amplifier 106 by means of conductor 128 and conductor 128 is connected through cathode bias resistor 130 to ground 72. Ground 72 is connected to rectifier 70 through resistor 132 and conductors 134 and 136. Resistor 132 is also connected to the center tap of secondary 96 by means of conductor 142.

It will be appreciated by those skilled in the art that the transformers 84 and 116 and amplifiers 100 and 106 comprise a conventional push-pull amplifying system and that the voltage of grids 98 and 104 change at the rate of 1020 cycles per second. By means of the current normally flowing through conductors 136 and 134 the resistor 132 the negative bias upon grids 98 and 104 is so great that normally no plate current flows through amplifiers 100 and 106 and therefore no current flows through the primary 114 of transformer 116. Consequently no voltage is induced in the secondary 144. The upper end of transformer 116 is connected by means of conductor 146 to terminal A of plug 148. This terminal A is connected, as by a suitable cable, to terminal A of plug 150 shown in Fig. 5 to which reference is now made. By means of conductor 152 terminal A of plug 150 is connected through potentiometer 154 and conductor 156 to pin 158, the detailed nature of which will be later described. The lower end of transformer secondary 144 is connected by means of conductor 160 to terminal D of plug 148 which in turn is connected to terminal D of plug 150 shown in Fig. 3. This last terminal is connected by means of conductor 162 through potentiometer 164 and conductor 166 to pin 168 which also will be later described. Secondary 144 is also tapped at a point intermediate its upper end and its center as seen in Fig. 4 by the conductor 170 which connects to terminal B of plug 148. This terminal connects with the terminal B of plug 150 which in turn is connected by means of conductor 172 through the rheostat 174 and conductor 176 with cone shaped section 48 to which reference has been made in connection with Figs. 2 and 3. Conductor 176 is connected to section 48 in the same manner that conductor 66 is connected to section 46 as seen in Fig. 3. Secondary 144 is also tapped by conductor 178 which connects with terminal C of plug 148, this terminal being connected to the terminal C of plug 150. By means of conductor 180 this last mentioned terminal is connected through rheostat 182 and conductor 184 with cone shaped plate 52. The purpose and nature of rheostats 154, 164, 174 and 182 will be later disclosed.

The center tap of secondary 144 is connected to ground 72 by means of conductor 186.

It has been shown that normally the bias of grids 98 and 104 of amplifiers 100 and 106 is so great that no current flows through primary 114, and consequently no voltage is induced across secondary 144. Therefore, the connections between secondary 144 and the plates 48 and 52 and pins 158 and 168 will not charge any of these last four mentioned elements. They cannot, therefore, establish an electrical field which may be picked up by a receiving antenna. Means for periodically shorting resistance 132, seen in Fig. 4, whereupon the negative bias on grids 98 and 104 is lessened so that plate current may flow through amplifiers 100 and 106 will now be described.

Referring to Fig. 4, rectifier 70 is connected through conductor 136 to leaf 190 of switch designated generally 192. The position of leaf 190 is governed by the position of rotatable cam 194, the exact nature of which will be later described. It is sufficient at this point to state that normally cam 194 is positioned so that leaf 190 is in contact with point 196 which is connected to conductor 198 which in turn is connected to point 200.

The position of leaf 202 is controlled by A-N cam 204 and leaf 202 is connected to ground 72 by means of conductor 206.

A-N cam 204 is mounted upon shaft 208 which is turned by motor 210 and this cam has a peripheral pattern such that leaf 202 alternately engages and disengages point 200 in a pattern corresponding to the Morse code signal for the letter A (. —). Whenever leaf 202 engages point 200 it will be understood that the direct current which normally flows from rectifier 70 through ground 72, resistor 132 and conductors 134 and 136 back to the rectifier will take the path of least resistance and instead of flowing through resistance 132 will flow to leaf 190, which normally engages contact 196, through contact 196 and conductor 198 to point 200 whence it travels along conductors 206 and 208 to ground 72. Consequently the voltage drop across resistor 132 will be eliminated and the potential of grids 98 and 104 will be increased in the positive direction. This increase in grid potential is sufficient to allow current to flow through amplifiers 100 and 106 and therefore through the primary 114 of transformer 116. However, as soon as cam 204 causes leaf to be disengaged from point 200 the current through the amplifier is stopped. Inasmuch as leaf 202 engages contact 200 in the Morse code signal pattern for the letter A (. —) it will be appreciated that current flows through primary 114 in the pattern of the Morse code signal for the letter A. A voltage will be induced across the secondary 144 of transformer 116 in the same pattern and by means of the connections and taps from this transformer to the plug 148, the cable between plug 148 and plug 150 and the connections between plug 150 and the cone shaped sections 48 and 52 as well as pins 158 and 168, it will be realized that these four last mentioned elements will be alternately charged and discharged by the voltages induced in primary 144 whenever leaf 202 is in engagement with point 200. Inasmuch as cone shaped section 48 and pin 158 are connected to the upper side of secondary 144 while section 52 and pin 168 are connected to the lower portion of the secondary, the potential of the first two elements will be in phase with one another but 180° out of phase with the potential of the latter two elements. Further, the potential of the two pins will be equal and greater than the potential of the two cone shaped plates, and the potential on the two plates will be equal. Inasmuch as the voltage of grids 98 and 104 is always changing at the rate of 1020 cycles per second, whenever sections 48 and 52 and pins 158 and 168 are being charged their potential is changing at the rate of 1020 cycles per second. Therefore these elements will establish a field of force in the Morse code pattern for the signal A (. —) and whenever charged their potential is varying at the rate of 1020 cycles per second.

Reference is now made to Fig. 4 which discloses a second pair of amplifiers 100' and 106' which are identical with the amplifiers 100 and 106. The amplifiers 100' and 106' are combined in a system having all elements identical with the system comprising amplifiers 100 and 106. The corresponding elements of the second system are given in the drawings primed numbers corresponding to the numbers in the first system.

Cam 194' is normally positioned so that leaf 190' contacts point 196', and contact 196' is connected to point 200' by conductor 198'. When leaf 202 is not in contact with point 200' the current from rectifier 70 flowing through conductor 136' and resistor 132' to ground 72 negatively biases grids 98' and 104' to such an extent that no plate current flows through amplifiers 100' and 106'. Therefore no voltage is induced in secondary 144' of transformer 116' and consequently the conductors 146', 170', 178' and 160' which connect to pin 158', conical section 50, conical section 46, and to pin 168', respectively, cannot charge these last four mentioned elements. However A-N cam 204, in addition to having a peripheral pattern such as to cause leaf 202 to contact point 200 in the Morse code signal pattern for the letter A (. _), also has the peripheral pattern necessary to cause leaf 202 to contact point 200' in the Morse code signal pattern for the letter N (_ .). Cam 204, leaf 202 and contact points 200 and 200' are arranged so that leaf 202 comes into engagement with the contact 200 or 200' at the instant that the leaf disengages from the other contact. When leaf 202 is engaged with contact point 200' and leaf 190' governed by cam 194' is engaged with point 196', as is normally the case, resistor 132' is shorted and the normally high bias upon grids 98' and 104' is removed so that plate current flows through amplifiers 100' and 106'. Inasmuch as grids 98' and 104' are energized by the 1020 cycle signal originating in oscillator 76 it will be appreciated that current flows through primary 114' in the Morse code signal pattern for the letter N (_ .), and that when so flowing the voltage across this primary varies at the rate of 1020 cycles per second. A voltage having the same signal pattern and variations is therefore induced in secondary 144' and by means of conductors 146', 170', 178' and 160', shown in Fig. 4, and by means of conductors shown in Fig. 5 bearing the primed numbers, a similar voltage is induced in pin 158', plate 50, plate 46 and pin 168'. It is believed unnecessary to point out the circuits in detail because terminal A' of plug 148 is connected to terminal A' of plug 150, etc., and the circuits bearing the primed numbers correspond exactly with those discussed above relating to the A-charged conical sections and pins.

The voltage induced in plate 50 is equal to the voltage induced in plate 46 but the two voltages are 180° out of phase. At the same time the voltage induced in pin 158' is equal to the voltage induced in pin 168' but is also 180° out of phase therewith. Also, the voltage induced in pin 158' is greater than the voltage induced in plate 50 but is in phase therewith and the same relationship is true of the voltage induced in pin 168' with respect to the voltage induced in plate 46.

By virtue of the disclosed arrangement the conical sections 48 and 52 and the pins 158 and 168 are charged in the Morse code pattern for the letter A (. _), the voltage of section 48 being equal to and 180° out of phase with the voltage of plate 52 while the voltage of pin 158 is equal to and 180° out of phase with that of pin 168. However the charge of pin 158 is in phase with that of plate 48 and the same is true of pin 168 and section 52. The sections 46 and 50 and pins 168' and 158' are charged in the Morse code signal pattern for the letter N (_ .) and the relative voltages have the same characteristics as those of the element charged in the A pattern.

Bearing this voltage pattern in mind, if a capacitive pick-up element were placed above plate 48 or 52 along the bi-sector of either of these plates the signal picked up by the element would be that of the Morse code signal pattern for the letter A. No N signal would be induced in the pick-up element. On the other hand if the element were placed above the bi-sector of either of the plates 46 or 50 the induced signal would be a pure N. However if the element were moved from the bi-sector of either of the N plates a substantial distance toward either of the A plates the N signal would still be predominant but the closer it came toward one of the A plates the louder would be the background A signal. If the element were moved to a point directly above one of the areas 220 which lie between the four quadrants of the assembly shown in Figs. 2 and 5 a steady 1020 cycle signal would be induced therein.

Figure 5:
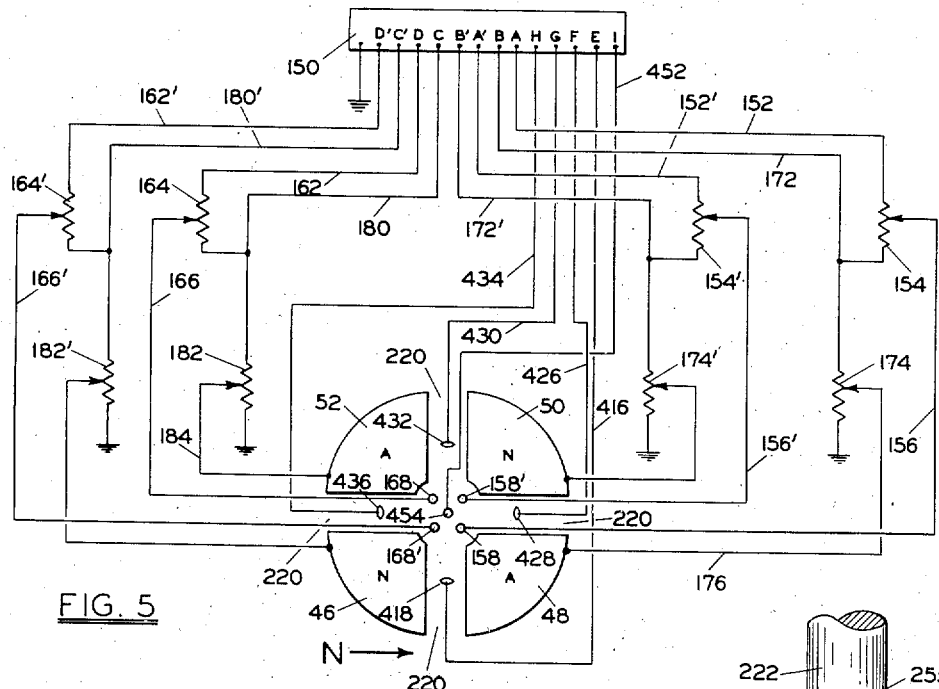
Fig. 5 is a diagrammatic view of the quadrant assembly and electrical connections thereto.

Therefore by virtue of the disclosed apparatus the movement of a pick-up element with respect to the assembly shown in Figs. 2 and 5 will result in a variation in the relative intensities of the A and N signals induced therein in the same manner that the signals received by a radio receiver in a plane in actual flight vary as the plane changes its position relative to the A and N quadrants of a real radio range.

Further, referring to Fig. 2, if the pick-up element were placed at a fixed height relative to a level surface above the quadrant assembly at a point above the periphery of one of the arcuate segments 32, 34, 36 or 38 the signal induced therein will be of a relatively low intensity because of the distance between the receiving antenna and the plates. As it is moved toward the center of the quadrant assembly it does not come closer to the arcuate plates, and therefore these elements do not increase the signal induced therein. However, at this time the pick-up element 25 will be coming closer to the cone shaped sectors, and therefore a slight increase in signal strength results. As the pick-up element is moved above the cone shaped sectors and inwardly further toward the center of the quadrant assembly, inasmuch as the distance between the conical sectors and the element will be more rapidly decreased the signal induced therein will increase more rapidly. When it closely approaches any one of the four pins 158, 168, 158' or 168' the higher voltage applied to these pins together with the fact that they are elevated above the highest point of the conical shaped plates results in a marked increase in the voltage induced in the element until it reaches the point in the center of the square formed by these four pins. At this point the equal and opposite voltages induced in the pick-up element result in a complete cancellation of voltages induced therein. As the element moves toward another of the four pins a high voltage will be induced therein and as it passes over the pin the induced voltage rapidly drops until it comes above one of the plates 46, 48, 50 or 52. As it moves outwardly toward the periphery of the quadrant assembly the intensity of the voltage induced in the element decreases in a manner inverse to that described when the antenna was traveling toward the center of the quadrant assembly.

The disclosed apparatus therefore provides an arrangement whereby the voltages induced in a capacitive pick-up element moving over a horizontal surface placed above the quadrant assembly will be varied, in simulation of the manner that the signals intercepted by a real radio received in a plane flying through a real radio range vary in intensity as the plane changes its distance from the transmitting towers of the real radio range.

A preferred type of pick-up element and means for connecting it to an audio receiver whose output varies directly with the strength of the voltages induced therein will now be disclosed.

Figure 6:
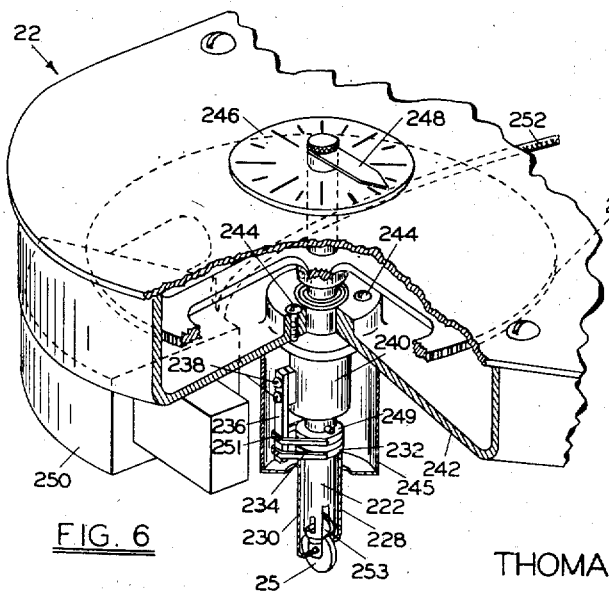
Fig. 6 is a detailed view of the inking wheel and a part of the recorder, certain parts being cut away for purposes of illustration.
Figure 7:
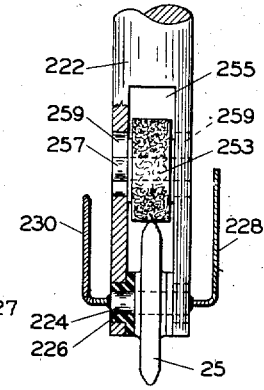
Fig. 7 is a cross sectional view of the shaft holding the inking wheel.

Reference is now made to Figs. 1, 6 and 7 which disclose an improved type of pick-up element which is a part of the preferred embodiment of this invention. In Fig. 1 the recorder is designated 22 and the propelling wheels by 23. The inking wheel of the recorder is designated 25. Reference is made to Figs. 6 and 7 which show the inking wheel 25 mounted in the lower end of vertical shaft 222 which is turned by main gear 27. The inking wheel is rotatably mounted upon a horizontal stud 224 which is held by an insulating bearing 226. A pair of shielded wires 228 and 230 are soldered to the ends of the stud 224 and each of these wires has its upper terminal affixed to the slip ring 232 which is suitably insulated from shaft 222. Brush 234 engages slip ring 232 and is fixedly held to bracket 236 which in turn is rigidly affixed by screws 238 to the bearing housing 240 which in turn is attached to the housing 242 of the recorder by means of screws 244. Shield 245 connected to the recorder surrounds the upper part of shaft 222, the slip rings and brushes. The conventional azimuth scale 246 and pointer 248 are provided at the top of recorder 22.

A second slip ring 249 is mounted on shaft 222 and is engaged by brush 251 which is suitably grounded. This arrangement therefore grounds shaft 222 and, in addition, recorder 22 is suitably grounded. Inking pad 253 is positioned in slot 255 in shaft 222 and is held by transverse stud 257 which is movable in slots 259 in shaft 222. This inking pad arrangement is highly desirable because the conventional inking pad clasp arrangement would result in distortion of the signals picked up by the inking wheel.

Figure 8:
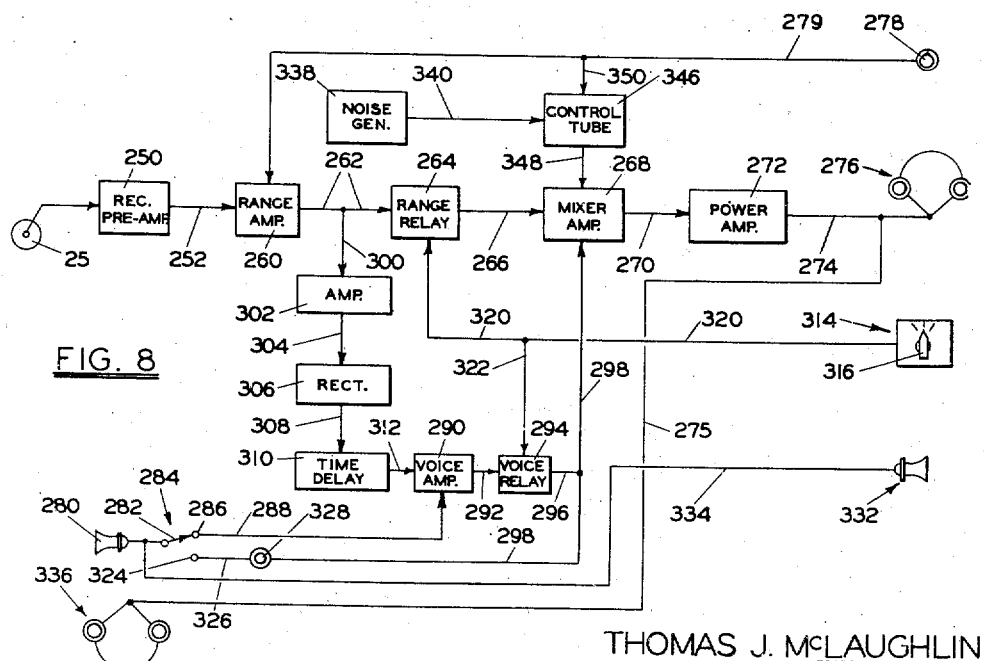
Fig. 8 is a diagram in block form of the audio receiver.

Brush 234 is connected by means of conductors (not shown) to the preamplifier 250 which is attached to the underside of recorder 22. This preamplifier is connected by means of cable 252 which, as seen in Fig. 1, extends generally upwardly and is carried by means of tube 254 to the audio receiver in desk 18. The audio receiver is connected by means of wires in cable 255 to the student's earphones in fuselage 12. The audio receiver is schematically shown in Fig. 8 to which reference is now made. In Fig. 8 the inking wheel is designated 25, this inking wheel serving as the capacitive pick up element. The inking wheel is connected to the recorder preamplifier 250 which by means of the cable 252 is connected to the range amplifier 260. Range amplifier 260 is connected by means of conductor 262 to range relay 264 which in turn is connected by conductor 266 to mixer amplifier 268. This mixer amplifier is connected by conductor 270 to power amplifier 272 which in turn is connected by conductor 274 to the student's earphones 276 which are in fuselage 12. By virtue of this arrangement therefore the voltages induced in the pick-up wheel 25 as the pick-up wheel is carried by the recorder over map 20 above the quadrant assembly 26 are translated into audible signals which are heard by the student using earphones 276. The signals heard will depend upon the position of inking wheel 25 above the quadrant assembly as previously described, and, of course, the position of the inking wheel depends upon the maneuvering of fuselage 12 by the student therewithin. The student within the fuselage 12 may therefore "fly" the fuselage 12 in response to the simulated radio range signals received just as a pilot in a real plane flies the plane in response to the real radio range signals intercepted, and in turn, the signals heard by the student depend upon the position of recorder 22 which is governed by fuselage 12.

It should be noted that the means of transmission from the quadrant assembly 26 to the inking wheel 25 is capacitive in nature.

A suitable volume control 278 under the control of the student is connected by conductor 279 to range amplifier 260 whereby he may adjust the intensity of the signals received by him just as a pilot in actual flight may adjust the volume control of his radio receiver.

It has been pointed out above that real radio ranges are equipped with voice transmitting facilities whereby the operator of the range may transmit oral intelligence as the occasion arises. This feature of real radio range navigation may be simulated by virtue of the provision of the microphone 280 which is under the control of the instructor. Microphone 280 is connected to the movable contact 282 of switch designated generally by 284 and when contact 282 is engaged by the instructor with point 286 which is connected to conductor 288, the voice signals are carried to voice amplifier 290 which is connected by conductor 292 to the voice relay 294. This relay is connected by conductors 296 and 298 to the mixer amplifier 268 which, as previously disclosed, is connected through amplifier 272 to earphones 276. The instructor may therefore give simulated weather reports, etc., to the student in the trainer in simulation of the transmitting of weather reports by the operator of a radio range station.

It is to be noted that the oral intelligence transmitted by microphone 280 does not pass through the quadrant assembly 26 but is combined with the A-N signals at the mixer amplifier 268. Inasmuch as in a real radio range the oral signals intercepted by the radio receiver are directly proportional in intensity to the intensities of the A-N signals, it will be realized that it would be advantageous to provide means whereby the oral signals transmitted by the instructor by means of microphone 280 have, when received by the student, an intensity corresponding to the intensities of the A-N signals. In order to accomplish this desired function, part of the voltage output of range amplifier 260 is fed by means of conductor 300 to amplifier 302 from which conductor 304 leads to rectifier 306. The rectified current will have a strength proportional to the intensity of the A-N signals passing through range amplifier 260, and this rectified current is fed by means of conductor 308 through a conventional time delay circuit 310 which connects with voice amplifier 290 by means of conductor 312. The output of the time delay circuit is used to bias the grid of the tubes of the voice amplifier 290, and consequently the strength of the voice signals originating at microphone 280 and carried by way of voice relay 294 to mixer amplifier 268 and power amplifier 272 to the earphones 276 will be directly proportional in intensity to the intensities of the A-N signals heard by the earphones 276.

The time delay circuit 310 is necessary in order that the silent periods in the A-N signals passing through range amplifier 260 will not result in sudden changes in the intensity of the oral signals in a pattern corresponding to the intermittent A-N signals.

It has been stated that real radio receivers used by planes for navigation by radio are equipped with filtering means under the control of the operator of the radio whereby he may filter out either the A-N signals or the oral signals being transmitted by the radio range station operator. The following means are incorporated in this invention in order that this practice may be simulated with this invention.

Seen in Fig. 8 is the 3-way "voice-simultaneous-range" switch designated generally 314 which is positioned within fuselage 12 to be under the control of the student. When the selector button 316 of this switch is placed in the leftmost position in Fig. 8, by means of conductor 320 range relay 264 is operated to open the circuit between range amplifier 260 and mixer amplifier 268 and the A-N signals are not heard by the student using the earphones 276.

On the other hand, if selector button 316 is placed in the rightmost position in Fig. 8, by means of conductors 320 and 322 voice relay 294 is operated to break the circuit between voice amplifier 290 and mixer amplifier 268 and the oral signals being transmitted by the instructor using microphone 280 will not be heard by the student using earphones 278.

Further when selector button 316 is in the position shown in Fig. 8, neither voice relay 294 nor range relay 264 breaks the circuit respectively controlled by it, and, therefore, earphones 278 will be responsive to the A-N signals picked up by inking wheel 25 as well as those originating at microphone 280.

In the event the student in fuselage 12 has selector button 316 in the rightmost position in Fig. 8 and the instructor has switch 284 positioned so that contact 282 engages point 286, if the instructor desires to talk to the student his voice signals cannot reach earphones 278. Consequently by placing contact 282 in engagement with point 324 which is connected by conductor 326, through volume control 328 and conductor 298 to the mixer amplifier 268, the instructor may communicate with the student using earphones 276. It should be noticed that the student has no control over this circuit and therefore the instructor may at any time give him such instructions as he desires. However it is contemplated that the instructor will use this last described communicating system only in the event that he wishes to talk to the student concerning matters which would not normally be transmitted over a real radio range. For example, he might desire to correct the student regarding certain procedures that he is making in the "flying" of the fuselage 12.

A microphone 332 for the use of the student in the fuselage 12 is connected by conductor 334 to the contact 282 so that the student may talk to the instructor using the earphones 336 which in turn are connected to conductor 274 by conductor 275.

A noise generator 338 which preferably comprises suitable leads connected to any available power line is provided, this generator being connected by conductor 340 to a noise control tube 346. The noise control tube is connected by means of conductor 348 to mixer amplifier 268 and it should be noted that the volume of the noise source is controlled by the student's volume control 278 by virtue of conductors 279 and 350 to keep the noise level commensurate with the signal level, just as the case in real radio reception. In this manner suitable interference may be introduced into the system to simulate the static heard by the operator of a radio receiver in a real plane. Noise generator 338 is preferably connected to a suitable power line because this source provides static characteristics bearing a marked similarly to the static intercepted by real radio range receivers.

The detailed circuits of the various elements disclosed in block diagram form in Fig. 8 are not given because this invention does not reside in the detailed construction of any of these units but rather in the novel combination of units individually well known to the prior art. Guided by the block diagram form shown in Fig. 8, any person skilled in the field of radio may arrange detailed circuits to satisfactorily accomplish all of the previously described functioning of the apparatus shown in Fig. 8.

It has been previously stated that periodically the A-N signals transmitted by real radio ranges are interrupted for the transmission of station identification signals. In real radio range practice two sets of station identification signals are transmitted, the first set being transmitted by the towers which transmit the N signals so that they are heard at any point in the range with an intensity equal to that of the N signals. The second set is transmitted by the A towers and are heard at any point within the range with the same intensity as are the A signals.

Referring again to Fig. 4 means are there disclosed for causing the quadrant assembly to transmit station identification signals, the first set being transmitted by the N plates and pins and the second set by the A plates and pins. Cams 194 and 194' are of a suitable three step type and are fixedly mounted upon shaft 352 which is connected to the shaft 208 by any suitable type of reduction drive 351, such as a ratchet arrangement. Shaft 208 is driven by motor 210. Shaft 352 is arranged to make one rotation for each fourteen rotations of shaft 208 and A-N cam 204. The three step peripheral pattern of cams 194 and 194' is arranged so that for fourteen rotations of A-N cam 204, leaves 190 and 190' engage contact points 196 and 196' respectively, and consequently fourteen sets of A-N signals are transmitted by the quadrant assembly, as previously described. However, upon the completion of the fourteenth rotation of A-N cam 204, cam 194' disengages leaf 190' from contact 196' and engages leaf 190' with contact 197' which is connected by conductors 199' and 199 with contact 354 of station identification selector switch designated generally 356. At the same time cam 194 disengages leaf 190 from point 196 but does not engage leaf 190 with point 197. It will be appreciated that the disengagement of leaf 190' from point 196' and of leaf 190 from point 196 renders A-N cam 204 ineffective from shorting the resistances 132 and 132' which shorting causes the quadrant assembly to be charged in the A-N pattern.

Station identification cams 358, 360, 362, 364 and 366 rotate with shaft 208 and each moves its controlled leaf 368, 370, 372, 374 or 376 into engagement with the point 378, 380, 382, 384 or 386. Each of these cams has a peripheral pattern corresponding to that of the call letters of a radio range station. When leaf 190' engages contact 197', any of the station identification cams 358, 360, 362, 364 or 366 may ground out the resistance 132' depending upon the position of the contact 354 of selector switch 356. In the case shown in Fig. 4 it will be seen that contact 354 engages the fourth terminal of selector switch 356 and therefore cam 364, by causing leaf 374 to engage and disengage point 384 in accordance with its peripheral pattern, shorts the resistance 132' in the same pattern and consequently the N quadrants are charged in accordance with the pattern of cam 364, which pattern is that of the call letters of a radio range station. As soon as one of the station identification cams 358, 360, 362, 364 or 366 has shorted out resistance 132' in a pattern corresponding to one set of station identification signals, cam 194' is rotated to its next step and leaf 190' becomes disengaged from contact point 197' but does not engage contact point 196'. Therefore the amplifier shown at the lower right of Fig. 4 is biased to such an extent that no plate current flows and consequently the N plates are not charged. However at the same time cam 194 turns to engage leaf 190 with contact point 197 and then one of the station identification cams 358, 360, 362, 364 or 366 may short the resistance 132 in accordance with its peripheral pattern the effective cam depending upon the position of selector 354. Again if selector 354 is placed as shown cam 364 will short resistance 132 to charge the A plates and pins in accordance with its peripheral pattern.

After one set of station identification signals has been transmitted by the A plates and pins, cams 194 and 194' simultaneously rotate to engage leaf 190 with contact 196 and leaf 190' with contact 196'. The A-N cam 204 is thereupon rendered effective to short the resistances 132 and 132' and the quadrant assembly is charged in the usual manner for the required number of A-N signals.

This invention therefore provides means whereby the elements of the quadrant assembly may normally be properly charged in an A-N pattern, the A-N pattern being intermittently interrupted, and the quadrant plates and pins for the period of the interruptions will be charged in a pattern corresponding to station identification signals. Selector switch 354 is under the control of the operator and he may select any one of the station identification cams depending upon the signal call letters of the station being simulated.

It has been stated that certain of the "legs" or equi-signal zones of a real radio range may be provided with auxiliary markers placed a few miles from the central transmitting towers which transmit upwardly a 3000 cycle note keyed in dash groups to identify the respective beacons of the range. Referring to Fig. 4 there is disclosed an oscillator 388 connected by conductor 390 to an amplifier 392 which is connected by conductor 394 to conductor 396 which extends upwardly in Fig. 4. Four switches designated generally 398, 400, 402 and 404 are provided, these switches being controlled by cams 406, 408, 410 and 412 respectively, which cams are mounted on shaft 208. The peripheral pattern of cam 406 is such that the switch 398 is closed in single dash groups; cam 408 closes switch 400 in groups of two dashes; cam 410 closes switch 402 in groups of three dashes and cam 412 closes switch 404 in groups of four dashes. Switch 398 is connected by conductor 414 to terminal E of plug 148 and referring to Fig. 5 it will be seen that terminal E of plug 150, which it will be recalled is suitably connected to plug 148, is connected by means of conductor 416 to fan marker 418. Switches 400, 402 and 404 are connected by means of conductors 420, 422 and 424 to terminals F, G, and H respectively of plug 148, these terminals in turn being connected to terminals F, G and H, respectively, of plug 150. Terminal F of plug 150 is connected by conductor 426 to fan marker 428; terminal G is connected by means of conductor 430 to fan marker 432 and terminal H is connected by conductor 434 to fan marker 436.

By virtue of this arrangement fan marker 418 is constantly charged with a series of dashes; fan marker 428 is constantly charged with a series of two dash groups; fan marker 432 is constantly charged with a series of three dash groups while fan marker 436 is similarly charged with a series of four dash groups.

Therefore whenever inking wheel 25 passes above any one of the four fan markers a signal corresponding to the pattern of charging of the particular fan marker will be picked up by the inking wheel and will be heard by the student using earphones 276, provided he has properly positioned switch 316 as previously described. The received fan marker signal will indicate to him that his assumed position is above the position of the fan marker which will be shown upon the map of the range being simulated. The student will of course have such a map in the fuselage 12.

Reference is now made to Figs. 3 and 9 which disclose the detailed nature of the fan markers. In Fig. 3 the fan marker 428 is shown. It will be seen that this marker comprises the conductor 426 which is surrounded by suitable insulating and grounded shielding material 438. The shielding in turn is held by vertical Bakelite tube 442 which passes through space 220 between conical sections 48 and 50 and is suitably held by the wooden block 42. Sections 48 and 50 may be suitably cut out to allow the positioning of Bakelite tube 442. The extreme upper end of conductor 426 is suitably connected to the inside of cylinder 444. Attached to the upper end of cylinder 444, as by soldering, is plate 448 which has an elliptical shape similar to that shown in Fig. 9. The major axis of plate 448 lies perpendicular to the equi-signal or on-course zone area 220. Further it should be noticed that ends of plate 448 extend downwardly from the center portion thereof.

By virtue of the just disclosed fan marker arrangement the fan marker signals are intercepted only when the inking wheel 25 is immediately thereabove.

It has been previously stated that many real radio ranges are provided with an auxiliary transmitter which transmits upwardly a 3000 cycle note, the field of transmission filling the otherwise present cone of silence. This feature may be simulated in this invention by the means disclosed in Figs. 3 and 4. Referring to Fig. 4 the 3000 cycle wave generated by oscillator 388 is carried by conductor 390 to amplifier 392 and by means of conductors 394 and 450 to terminal I of plug 148 which is connected to terminal I of plug 150 seen in Fig. 5. This last terminal I is connected by conductor 452 to the Z marker pin 454. This pin is located as seen in Fig. 5 in the middle of the four A-N pins 158, 168, 158' and 168'. Whenever the inking wheel 25 is directly above Z marker pin 454 the 3000 cycle signal will be picked up instead of a complete absence of signal which would otherwise result from the cancellation of the voltages induced in the four A-N pins.

Referring to Fig. 3 the conductor 452 is shown to be surrounded by insulation 456 and at the upper end of the conductor 452 is the Z marker pin 454. A Bakelite block 453 is mounted in the top of block 42 and pin 454 is suitably held in the center thereof.

Still referring to Fig. 3 the insulated conductor 166' which connects to pin 168' is shown. Bakelite block 453 is suitably molded to allow conductor 166′ to pass upwardly therethrough, and this block is also suitably molded to allow pin 168′, shown in detail in Fig. 10, to be set thereinto. Pin 168′ comprises a cylindrically shaped member 169′ made of Bakelite having a slot 171′. A metallic member 173′ has the upper end of wire 166′ soldered therein. It should be noted that wire 166′ and member 173′ are positioned eccentrically of Bakelite cylinder 169′, and, therefore, by means of a screw-driver the members 166′ and 173′ may be moved to lie along the bisector of the cone shaped sector 46. This is necessary because when inking wheel 25 moves along the bisector of a quadrant of a real radio range, a pure A or N only is heard. The other pins 158, 158′ and 168 are identical with the pin 168′ shown in Fig. 10 and are held by insulating block 453 in the same manner.

Reference is now made to Fig. 10 which shows the N transmitting pin designated in Fig. 5 by 168′.

Figure 11:
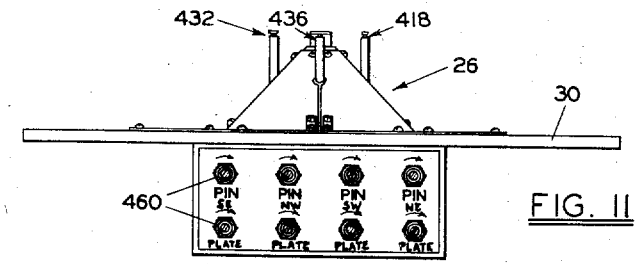
Figs. 11 and 12 are front and rear elevations, respectively, of the quadrant assembly.
Figure 12:
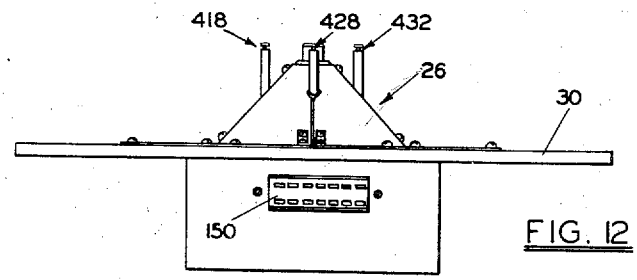

Reference is now made to Figs. 11 and 12 which are front and rear elevations respectively of the quadrant assembly. Seen in Fig. 12 is the plug 150 to which reference has been previously made. This plug is provided at the rear of the quadrant assembly to facilitate connecting the cable from the plug 148 of the transmitter shown in Fig. 4.

Shown in Fig. 11 are eight slotted adjusting elements designated generally 460 which may be positioned by the use of a screw driver. Each of these adjusting means 460 may be used to control one of the potentiometers 154, 174, 154′, 174′, 164, 182, 164′ or 182′ shown in Fig. 5. It will be understood that an adjustment of any of these potentiometers control the potential applied to the A-N plate or pin which is connected through the potentiometer in question to the plug 150 and transmitter shown in Fig. 4. This adjustment may be used to achieve proper relative signal intensities.

In the use of the previously described apparatus the quadrant assembly 26 is positioned and adjusted in the desk 18, as best seen in Fig. 1, so that the signal field set up by the quadrant assembly coincides with the signal field as shown upon the map 20. This step having been accomplished the recorder 22 may be properly oriented with the map 20, in the usual manner, the inking wheel 25 being placed at the exact spot on map 20 where it is assumed that the trainer is located at the beginning of the problem. The inking wheel, which as earlier stated represents the exact spot where the trainer is assumed to be located, will then pick up a signal from the quadrant assembly 26 which exactly simulates the signal that a real plane would intercept were it at a corresponding point in the real radio range being simulated. Thereafter, as the student "flies" the trainer the recorder traces exactly its assumed course and the signals picked up by inking wheel 25 and heard by the student using the earphones vary exactly as would the signals heard by the pilot in a real plane flying a corresponding course through a real radio range corresponding to the one being simulated.

Numerous changes may be made in the details of this invention without departing from the substance thereof.

I claim:

1. In a radio navigation training device of the type comprising means for establishing a miniature field of force having a pattern corresponding to the radiated field pattern of a real radio range station, the combination of a plurality of chargeable members arranged relative to one another in a manner to establish, when charged, the above-mentioned miniature field, means for intermittently charging said members at a given potential in a predetermined pattern, a second plurality of chargeable members, and means for charg'ng said second members in the same predetermined pattern and at a higher potential, said last mentioned chargeable members being arranged relative to the first mentioned chargeable members so that when charged they establish a field near the center of and stronger than the field established by said first members.

2. In a radio navigation training device of the type comprising means for establishing a miniature field of force having a pattern corresponding to the radiated field pattern of a real radio range station, the combination of a plurality of chargeable members arranged relative to one another in a manner to establish, when charged, the above-mentioned miniature field, means comprising a transformer for intermittently charging said members at a given potential in a predetermined manner, a second plurality of chargeable members, and means comprising said transformer for charging said second members in the same predetermined pattern and at a higher potential, said last mentioned chargeable members being arranged relative to the first mentioned chargeable members so that when charged they establish a field near the center of and stronger than the field established by said first members.

3. In a radio navigation training device of the type comprising means for establishing a miniature field of force having a pattern corresponding to the radiated field pattern of a real radio range station, the combination of four chargeable members arranged relative to one another in a manner to establish, when charged, the above-mentioned miniature field, four additional chargeable members, each of said last mentioned members being positioned adjacent a different one of said first mentioned members so that when charged they establish a field near the center of and stronger than the field established by said first members, and means for charging the adjacent members in the same predetermined pattern, said charging means including means for charging each of said second mentioned members at a potential higher than that of said first mentioned members.

4. In a radio navigation training device the combination comprising a plurality of chargeable members insulated one from the others and arranged to form a substantially solid pattern with a central opening and radial spaces when viewed from a given direction, a second plurality of chargeable members insulated one from the others and from said first mentioned chargeable members located within said central opening, each of said second mentioned members being located adjacent a different one of said first mentioned members, and means for charging the adjacent pairs of members in the same predetermined pattern, said charging means comprising means for charging said centrally located members at a potential higher than said outlying members.

5. A device for teaching navigation by radio comprising, in combination, two pairs of chargeable members and means for charging each pair of members in a predetermined pattern, said charging means comprising a first normally operative pattern determining means for charging each pair of members in a predetermined pattern, a second normally inoperative pattern determining means, and switching means intermittently operated to render said normally operative pattern determing means inoperative and to render said normally inoperative pattern determining means operative, said switching means comprising means for separately charging each pair of chargeable members in accordance with the pattern of said normally inoperative pattern determining means when said normally operative charging means is rendered inoperative.

6. In a radio navigation training device of the type comprising means for establishing a miniature field of force having a pattern corresponding to the radiated field pattern of a real radio range station, the combination of a plurality of chargeable members arranged relative to one another in a manner to establish, when charged, the above mentioned miniature field, a second plurality of chargeable members arranged relative to the first mentioned chargeable members so that when charged they establish an additional field near the center of and stronger than the field established by said first members, electronic-tube means connected to said chargeable members to charge the same, and means for interrupting the plate current of said electronic-tube means to charge the said chargeable members in a predetermined pattern.

7. A radio navigation training device comprising a plurality of metallic plates each shaped generally like a wedge when viewed from a given direction and all being arranged to form a pattern corresponding generally to the quadrant pattern of a real radio range station when viewed from the same direction, and means for charging said plates in a predetermined pattern, said charging means comprising a first normally operative pattern determining means for charging said plates in a predetermined pattern, a second normally inoperative pattern determining means, and switching means intermittently operated to render said normally operative pattern determining means inoperative and to render said normally inoperative patern determining means operative, said switching means comprising means for successively charging certain of said plates in accordance with the pattern of said normally inoperative pattern determining means when said normally operative charging means is rendered inoperative.

THOMAS J. McLAUGHLIN.

REFERENCES CITED

The following references are of record in the file of this patent:

UNITED STATES PATENTS

| Number | Name | Date |
| --- | --- | --- |
| 1,937,876 | Donovan | Dec. 5, 1933 |
| 2,005,798 | Moser | June 25, 1935 |
| 2,234,828 | Luck | Mar. 11, 1941 |
| 2,352,216 | Melvin et al. | June 27, 1944 |